United States Patent
Gronau et al.

(10) Patent No.: US 6,745,143 B1
(45) Date of Patent: Jun. 1, 2004

(54) METHOD AND DEVICE FOR DETERMINING CORRECTION VALUES FOR WHEEL SPEEDS

(75) Inventors: Ralph Gronau, Wetter (DE); Alexander Stiller, Garbsen (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 0 days.

(21) Appl. No.: 09/647,109

(22) PCT Filed: Mar. 26, 1999

(86) PCT No.: PCT/EP99/02067
§ 371 (c)(1),
(2), (4) Date: Dec. 27, 2000

(87) PCT Pub. No.: WO99/50113
PCT Pub. Date: Oct. 7, 1999

(30) Foreign Application Priority Data

Mar. 31, 1998 (DE) .......................................... 198 14 206
Jul. 20, 1998 (DE) .......................................... 198 32 483

(51) Int. Cl.⁷ .............................................. G01C 17/38
(52) U.S. Cl. .......................................... 702/96; 701/74
(58) Field of Search ...................... 702/14, 96; 303/163, 303/173, 122.06, 182, 189, 187, 188, 170; 701/74, 72, 70, 71, 75; 700/279

(56) References Cited

U.S. PATENT DOCUMENTS 5,058,019 A * 10/1991 Litkouhi ...................... 701/74
5,682,333 A    10/1997 Baumann

FOREIGN PATENT DOCUMENTS

| DE | 37 18 421 | 12/1988 |
|----|-----------|---------|
| DE | 37 38 914 | 5/1989 |
| DE | 40 19 886 | 9/1991 |
| DE | 41 11 614 | 10/1992 |
| DE | 41 13 278 | 10/1992 |
| DE | 42 30 295 | 3/1994 |
| DE | 43 27 491 | 2/1995 |
| DE | 44 24 318 | 1/1996 |
| DE | 196 26 042 | 1/1997 |
| DE | 196 02 994 | 7/1997 |
| EP | 0 508 146 | 10/1992 |
| EP | 0 855 597 | 7/1998 |

* cited by examiner

Primary Examiner—John Barlow
Assistant Examiner—Stephen J. Cherry
(74) Attorney, Agent, or Firm—Rader, Fishman & Grauer PLLC (57) ABSTRACT

A method is provided for determining correction values for the wheel speeds of a vehicle, comprising the step of determining the speeds of the vehicle wheels during travel, with the speeds of the vehicle wheels being evaluated, in groups, for at least one vehicle axle and at least one vehicle side values of correction for the individual vehicle wheels being determined in accordance with the evaluation results. Moreover, a device is provided for determining corection values, comprising wheel sensors for determining the speeds of wheels of the vehicle during travel, and a determining means evaluating the speeds of the vehicle wheels, in groups, for at least one vehicle axle and at least one vehicle side, and determining correction values for the individual vehicle wheels in accordance with the results of evaluation.

27 Claims, 7 Drawing Sheets

METHOD AND DEVICE FOR DETERMINING CORRECTION VALUES FOR WHEEL SPEEDS

TECHNICAL FIELD

The present invention generally relates to a system for determining wheel speed and more particularly relates to a method and a device for determining correction values for use in determining vehicle wheel speeds.

BACKGROUND OF THE INVENTION

Wheel speeds normally are sensed by wheel sensors. Wheel sensors of this type, normally, are so designed as to sense angular speeds, for example, by monitoring on a sensor the passage of markings that move along with the wheel, thereby obtaining a pulse sequence the frequency of which rises the wheel speed increases.

The wheel speed, in technical language also called circumferential speed of the wheel, is related to the rotating or angular speed by the mathematical relationship: v=ω. r, wherein v is the wheel speed (more precisely speaking, the circumferential speed of the wheel); ω is the angular speed of the wheel and r is the tire radius. The tire radius is, therefore, integrated into the computation of the wheel speed. The tire radius can be determined, for example, from manufacturer' data by applying an average value within the manufacturing tolerances. As the tire radii can vary on the individual wheels of a vehicle, for example, due to wear, manufacturing tolerances, use of tires from different manufacturers etc., and as the precise values of the radii are not known, the wheel speed can be computed from the directly sensed (and, optionally, filtered) angular speed of the wheel considered by way of approximation only.

In comparatively precise slip and stability controls but also for algorithms of vehicle state detection employing, for example, the wheel slip or the wheel speed differences etc., it is, therefore, mandatory to eliminate the negative influence of different fire radii. Consequently, correction values will have to be determined for each individual wheel by which the corresponding wheel speed can be corrected, as the wheel speeds, in the majority of cases, are determined on the assumption that the wheels are of exactly the same tire radii.

DE 4 424 318 C2 teaches a traction slip control system stipulating conditions for determining correction factors. The vehicle sides (left or right) are separately considered. A tire tolerance computation is permitted if predetermined conditions with respect to the butterfly throttle angle, on the one hand, and with respect to the relationship of the speeds of the wheels of actuated and non-actuated axles on the vehicle side under consideration, on the other hand, have been complied with.

This prior art method involves the disadvantage that by comparing the non-corrected wheel speeds, the scaling conditions in a substantially deviating wheel, frequently, are fulfilled, thereby substantially affecting the accuracy of a subsequent evaluation method. Moreover, no criteria are quoted for scaling the wheel speeds of the left-hand vehicle side to the right-hand vehicle side.

DE 3 718 421 reveals a method for cornering detection and for determining a correction factor by which the relationship of the tire radii of the non-actuated axle is determined. This state-of-the-art method proceeds from the assumption that the cornering-dependent influence on the determination can be eliminated through a long-time filtration of between 30 and 40 seconds. However, when dealing with winding roads this assumption will either yield inaccurate results or substantially higher time constants should be selected for filtering, which would involve extended instruction times.

U.S. Pat. No. 5,682,333 describes a method of scaling the wheel speeds for a vehicle, wherein the scaling factors for the wheels are determined to detect scaled and corrected speeds. In a first step of the this method, a rough-stage determination of scaling factors is carried out by means of fast and rough scaling, if non-cornering, a predetermined minimum speed and a low vehicle acceleration, at best, have been detected. Subsequently, a fine-stage scaling factor is determined by fine scaling, wherein either each wheel of an axle is scaled to the respective wheel on the same side of the other axle, if a low driving moment exceeding of a minimum speed have been detected, or each wheel on one side is scaled to the respectively opposite wheel of the same axle, if a higher driving moment, a moderate cornering, at best, and the exceeding of a minimum speed have been detected.

It is the object of the present invention to provide a method and a device for determining correction values for the wheel speeds of a vehicle, enabling a rapid, reliable and accurate determination of correction values for all wheels of the vehicle.

As in state-of-the-art slip control functions, wheel speeds, frequently are compared axle- or side-wise, it is important for the wheel speed values to be comparable axle-wise (at the front axle or at the rear axle) and side-wise (right-hand side, left-hand side). Virtually, this will result in the condition that all wheel speeds of the vehicle must be comparable with one another in pairs so that a corresponding set of factors of corrections is to be determined. If there is no need to precisely determine the absolute value of the wheel speeds it may be adequate to select a factor of correction (preferably a "rounded" value) and to determine the values of correction for the rest of the wheels in relation thereto.

First, individual scalings are performed for at least one vehicle side (the left-hand wheels and right-hand wheels, respectively) and for at least one vehicle axle (the wheels on the front axle and the wheels on the rear axle). Proceeding from these individual scaling results the final scaling is then carried out to determine the afore-mentioned values of correction.

Preferably, individual scalings are effected for the left-hand- and right-hand-sides of the vehicle and for the vehicle axle non-actuated (or deemed or identified as non-actuated). After such scaling having been carried out, the complete set of correction values is determined for all wheels of the vehicle. Scaling for one vehicle side for one vehicle axle is effected by evaluating the wheel speeds sensed for the wheels on that side and on that axle, respectively. Evaluation can be in real time (immediate processing the momentarily sensed values) or in reference to temporarily stored values.

DETAILED DESCRIPTION OF THE PREFERRED EMBODIMENTS

Figure 1:
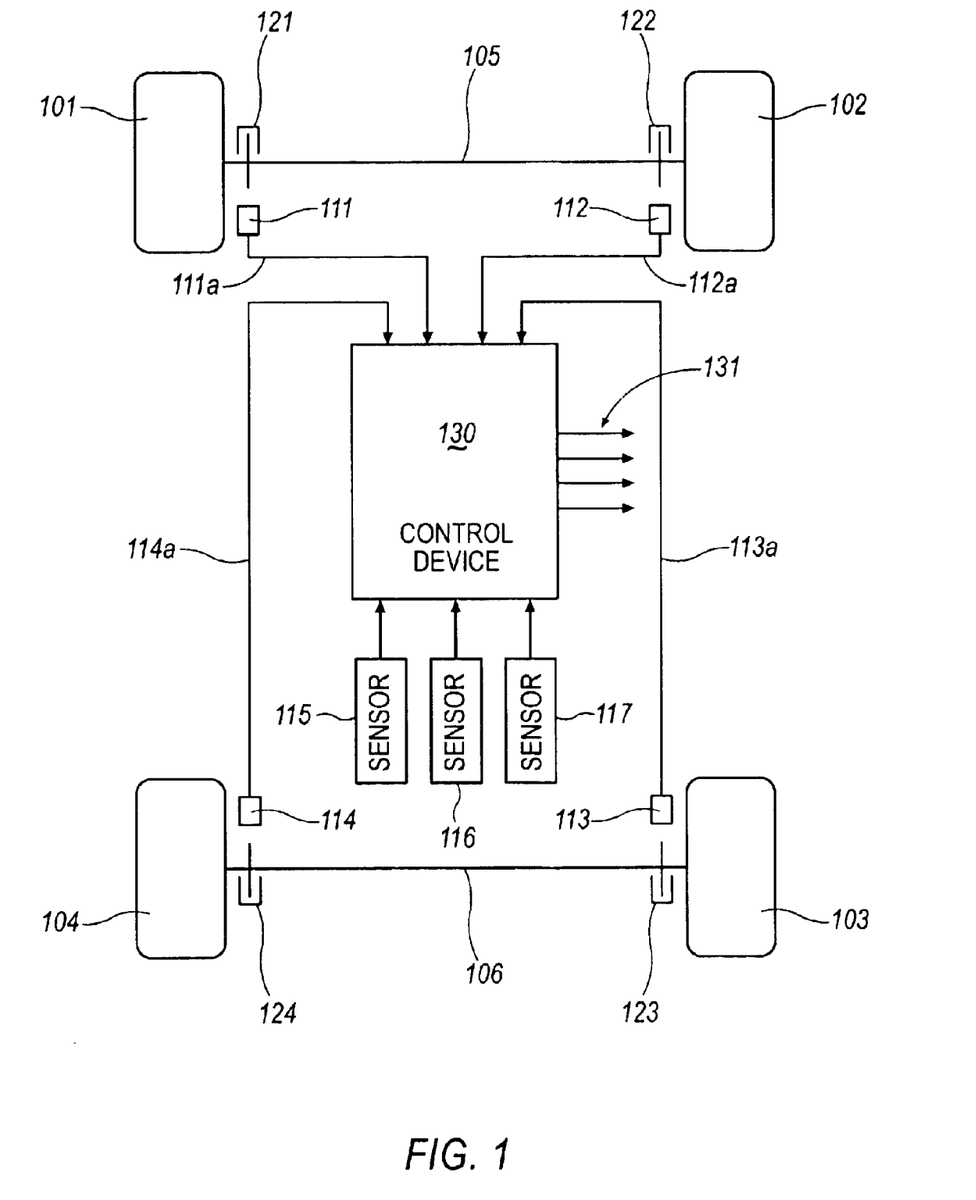
FIG. 1 schematically shows a vehicle wherein the invention can be employed.

Referring to the drawings, FIG. I schematically shows a vehicle having four wheels 101–104. Wheels 101 and 102 are located on the front axle 105 while wheels 103 and 104 are provided on the rear axle 106. Each of the wheels includes wheel brakes 121–124. Moreover, wheel sensors 111–114 are provided for each individual wheel, each supplying signals via signal conduits 111a–114a, to a device 130, with the signals being a measurement of the sensed speeds of the individual wheels. The device 130 can be a control or steering mechanism in the broadest sense of the word, which, through additional sensors 115–117 generates output signals 131 suitable to act, in particular, on brakes 121–124 of the individual wheels to exert a favorable influence thereon. Other set members of slip control functions, such as check valve, ignition angle adjustment or gating and other pick-up means for the corrected wheel speeds, can also be favorably influenced. The wheel signals coming in through conduits 111a–114a, among others, are influenced by the radius of the respective wheel as previously explained.

Figure 2:
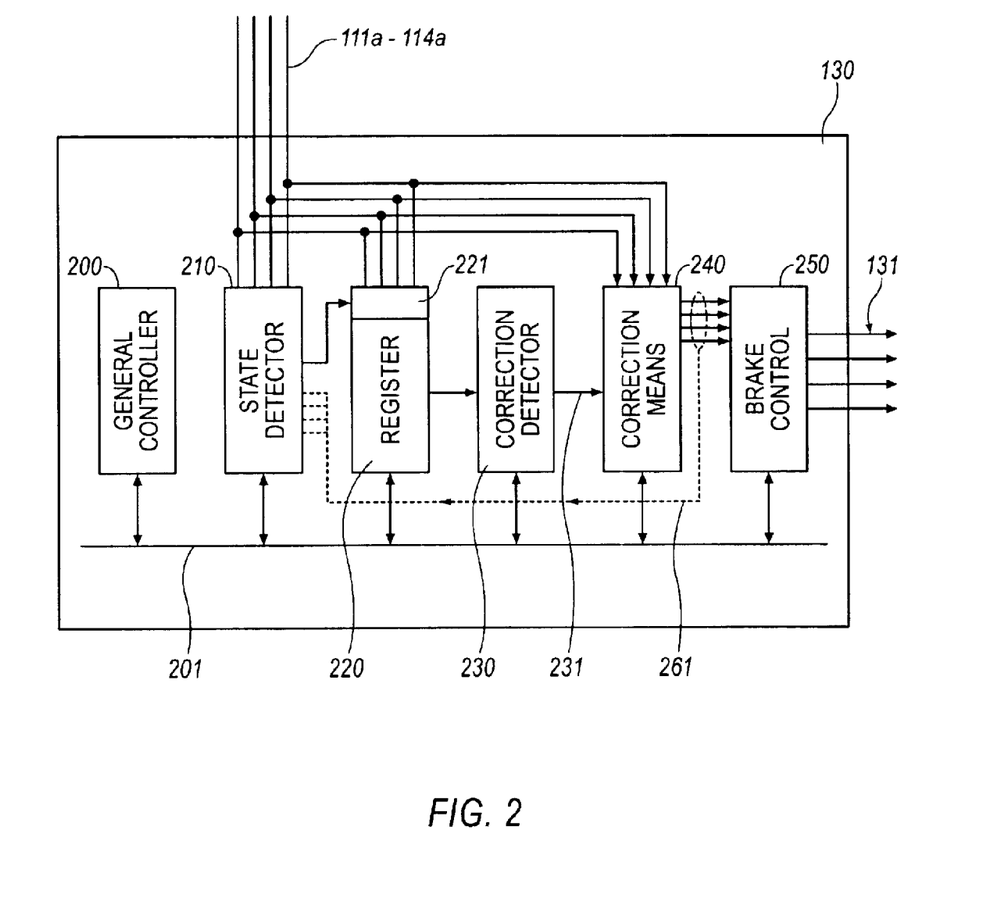
FIG. 2 schematically shows a device of the invention for determining correction values.

Consequently, device 130 is provided with a means for determining correction values for the said signals, and a means for correcting the signals in accordance with the determined correction values as clearly shown in FIG. 2.

FIG. 2 is to be understood as a functional block diagram. Identical elements of FIG. 1 are designated by the same reference numerals. The device 130 comprises a general control 200, a state detection means 210, a register 220, a correction factor detecting means 230, a correction means 240 and a general brake control or regulator 250. To perform general control functions, the afore-mentioned components are interconnected via a passageway 201 to thereby enable an exchange of information required for the operation or functional sequence.

The way of operation of the afore-mentioned components will be described hereinafter. The signals 111a–114a of the individual wheel sensors 111–114 generally are received by device 130 for (optionally selective) storage in register 220. The selection can be controlled by the state detecting means 210 or by a corresponding additional sensor equally making reference to the signals 111a–114a. An alternative is shown in broken line 261 according to which the state detecting means 210 makes (only) reference to the corrected wheel signals as generated by the correcting means 240. During determination of the correction values, these values are determined in the way as generally set out in the afore-going and as described in greater detail hereinafter, followed by input thereof in the correcting means 240 for correction of the wheel signals 111a–114a in accordance with such values of correction, and for passage thereof to all control and regulating means (e.g. brake control 250) that require corrected wheel speeds. The means for determining the values of correction, hence, comprises, in particular, the means 230 for determining the values of correction, optionally including the register 220 and the state detecting means 210.

The determination of the values of correction is based on an evaluation, in groups, of the sensed wheel speeds. The wheel speed values are group-wise sensed on one vehicle side (for example on the front wheel, left, and on the rear wheel left, or on the front wheel, right, and rear wheel, right) and on one axle, respectively, (for example, rear, left and rear, right). The evaluation within one group also called "scaling" can be, for example, the ratio formation, the difference formation or a comparison, for which the values of one wheel of the group and of the other wheel of the group are respectively used. Longitudinal scaling thus covers the group-wise evaluation of the wheel speeds of one vehicle side (for example longitudinal scaling, left: group-wise evaluation of the speed of the wheels of the left-hand vehicle side; transverse scaling of the non-actuated axle: group-wise evaluation of the speeds of the wheels on the vehicle axle non-actuated or deemed non-actuated).

For clarifying purposes it should be noted that the language "wheel signals" refers to signals already processed to such an extent that they identify the wheel speed (preferably as a digital value). The wheel signals on the conduits 111a–114a are not to be regarded as pulse sequences. If the wheel sensors 111–114 only generated pulse sequences, additional processing in device 130 would be needed to determine the required speed data from the said pulse sequences.

FIG. 2 shows an embodiment wherein the speed values used for the evaluation are temporarily stored in register 220 to be discharged therefrom immediately or subsequently by device 230 determining the correction values. Storing of the wheel speeds 111a–114a, preferably, is selectively effected to the extent that such data is respectively used for evaluating one group as has been collected at times and states providing favorable values for the considered group. Such times and driving situations can be detected by the state detecting means 210. The state detecting means 210 makes reference to the wheel speed values 111a–114a (and/or to the values 261 already corrected), releasing or blocking storage of the respectively considered data via a schematically shown gate 221.

This will insure that the means 230 determining the correction values respectively makes reference to such wheel speed values as have been collected at "favorable" times. The meaning of "favorable" times will be described hereinafter.

The group-wise evaluation of the wheel speeds, preferably, is for the wheels of the left-hand vehicle side, the wheels of the right-hand vehicle side and the wheels of the axle non-actuated (or deemed non-actuated). Three relationships arise from these three group-wise evaluations. If, moreover, one of the factors of correction is selected (for example in respect of 1) the rest of the factors of correction can be determined from the three individual scalings (evaluations in groups). The means 230 will write the values of correction as determined into the means of correction 240, overwriting previous correction values so that the (new) correction values can be used for the correction of the wheel speeds 111a–114a.

Figure 3:
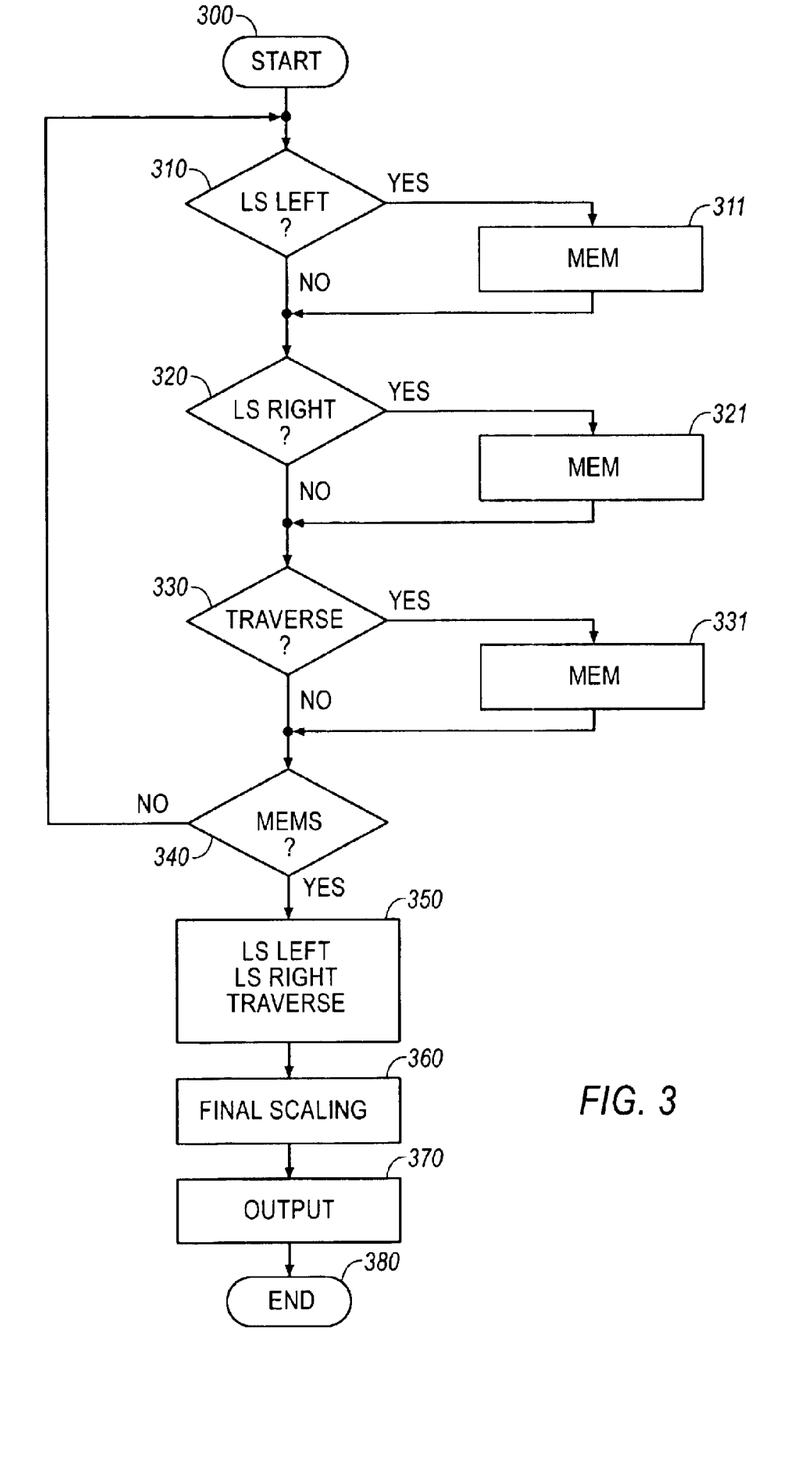
FIG. 3 shows, in the form of a flow diagram, a method of the invention for determining correction values.

Referring to FIG. 3, the method of the invention will be basically described, beginning with the start-up step 300. The process can be released upon compliance with predetermined conditions, for example, lapse of a predetermined period of time, starting up the vehicle, performance of maintenance work and the like, followed by inquiries 310–330. The order of sequence as shown is by way of example; it can also be otherwise. For example, steps 310–330 can be performed in parallel. 310 checks whether a favorable state exists for longitudinal scaling on the left-hand vehicle side. In the affirmative, the required wheel data is stored (in register 220), see step 311. Step 320 checks for conditions favorable to longitudinal scaling on the right-hand side. In the affirmative, the required data is stored in the register, see step 321. Step 330 checks whether the wheel data storage for transverse scaling of the axle not actuated (or deemed not actuated) is still necessary and whether favorable conditions exist herefore. In the affirmative, the required data is stored (step 331). After update and storage of required data has been determined for the individual scalings, it is proceeded to step 350 to carry out the individual scalings (longitudinal scaling, left; longitudinal scaling, right; and transverse scaling of the axle non-actuated or deemed non-actuated). With reference to the results then determined, final scaling for determining all factors of correction is effected in step 360. In step 370, the values of correction as determined are issued (in FIG. 2, for example, from device 230 to device 240). Permanent passage through the algorithm is favorable as changes must be made at any time since changes in radii can never be excluded (for example, mounting of an emergency wheel without interrupting the ignition process).

According to the described form of embodiment, the individual scalings, hence, are not directly carried out at the time where conditions favorable for a comparison prevail. The then collected data is rather stored temporarily, it being possible that scaling takes place at a later date. According to an alternative not shown in the flow diagram of FIG. 3, the data collected under favorable conditions can be directly used for scaling. Scaling then takes place at the time where the data is factually determined. A temporary storage of the data can then be foregone.

The evaluation in groups and the individual scalings, respectively, and the determination of the favorable conditions herefore, will be described hereinafter.

Generally speaking, favorable conditions for the wheels of a group prevail if there are no speed differences between the wheels of the said group, for example, due to (varying) slip or geometrical conditions likely to occur in cornering, for in that case it can be proceeded from the fact, that speed conditions detected within a group are, in fact, to be attributed to the currently existing tire radii rather than to transient detrimental effects. This will mean to transverse scaling (group-wise evaluation of the speeds of the wheels of one axle) that cornering should be avoided because speed differences will occur in view of the different bend radii between inner bend wheel and outer bend wheel. Moreover, in view of other drive-dynamic effects, speed differences will arise that are not to be attributed to the different tire sizes. Consequently, cornering would be a criterion of exclusion for transverse scaling. Advantageously, only stable or vibration-free wheel speeds are evaluated or used for scaling purposes. In longitudinal scaling it should be made sure that traction slip on the driven axle be not deemed a tire deviation, and that cornering be excluded.

In the practice of the invention, the afore-mentioned conditions as established for a group should be inquired individually; then scaling is to be carried out for that group and the then collected data is to be stored, respectively, in order to enable a subsequent scaling on the basis of the data stored. This will involve the advantage that the relevant data can be collected earlier as less conditions will have to be complied with simultaneously to permit the group-wise evaluation for a group (or the data storage herefore, respectively).

The detection of the favorable conditions can be effected in reference to the sensed wheel speeds and/or in reference to the wheel speeds corrected (under consideration of the former values of correction) (see FIG. 2 marking the signal guide 261). However, the determination of the correction value as such is effected in device 230 in reference to the sensed wheel speeds 111a to 114a which according to FIG. 2 are stored in register 220. Hence, conditions for transverse scaling (preferably on the axle non-actuated or deemed non-actuated) can be checked independently of conditions for longitudinal scaling to the left and independently of conditions for longitudinal scaling to the right.

The condition for longitudinal scaling to the right has the following formula:

$$V_{knr} > V_{kar}$$

if the driving moment on the actuated wheel of the right-hand side is positive, and $$V_{knr} < V_{kar}$$

if the driving moment on the right-hand driven wheel is negative, wherein V designates the wheel speeds; k the corrected value (via conduit 261 in FIG. 2); n the value on a non-driven axle; a the value on a driven axle; and r the wheels of the right-hand vehicle side. In respect of vehicles for which no information on the motor moment is available, the vehicle acceleration or delay can be used by way of alternative. The same conditions apply to the left-hand side, mutatis mutandis, with r being replaced by 1 in the quotation of the indexed variables. By the inquiry design it can be safeguarded that traction slip or trailing slip on the axle driven (or deemed driven) is lower than the speed difference caused by different radii so that the speed differences can, in fact, be attributed to different tire radii; the then effected evaluation does, in fact, result in values of correction merely mirroring the different tire radii rather than a detrimental transient effect.

If, for example, a favorable condition for longitudinal scaling to the left has been detected (inquiry 310 in FIG. 3) the then available speed values or speed conditions of the wheel 101 and of the wheel 104 can be stored in register 220 (311 in FIG. 3). Also, this group of wheel speeds can be evaluated immediately.

Longitudinal scaling for the wheels of one side can be effected as follows, it being still proceeded from the example of the left-hand vehicle side: Preliminary values of correction DVP1 and DVP4 are determined for wheel 101 and wheel 104, with a preliminary value of correction being first selected for one wheel, preferably the slower one. A preliminary value of correction for the other wheel is then computed therefrom and from the ratio of the wheel speeds. Assuming that the wheel 104 is slower than the wheel 101, the following applies:

for Vs4<Vs1:

$$Kv4 = C$$
$$Kv1 = Kv4 \times Vs1/Vs4$$

wherein Vs1 and Vs4, respectively are the speeds of wheels 101 and 104, respectively resulting from the wheel sensor values 111 and 114, and Kv1 and Kv4 are preliminary values of correction for the speeds of the wheel 101 and of the wheel 104, respectively.

If the preliminary values of correction are calculated immediately (optionally, with no temporary storage in register 220 in FIG. 2), the variables Kv1 and Kv4 can be filtered with the aid of a low pass filter (preferably of the first order with limited change speed) to thereby continuously exclude transient detrimental effects.

The preliminary values of correction Kv2 and Kv3 for the wheels of the right-hand side will be computed accordingly, resulting in two sets of preliminary factors of correction by way of which the wheel speeds of one vehicle side can be so corrected that the wheel speeds can be compared side-wise. In order to make all wheels of the vehicle comparable in pairs, another scaling will be required, in particular, a transverse scaling, preferably on the axle not actuated (or deemed non-actuated). It is also in this respect that first a favorable time or a favorable driving situation, respectively, will have to be determined. Cornering should be excluded as in the light of the vehicle geometry the bend-outer wheels run on a larger circular radius than the bend-inner wheels. In view of the larger distance to be covered the outer wheels have a higher wheel speed. For detecting straight travel, the information empirically gained can be used:

Statistically, straight driving occurs more frequently than driving on route segments that are characterized in that they have a constant bend radius and that exactly the same bend radius repeatedly occurs in different route segments.

Driving into or out of a bend is characterized by dynamic steering during driving into and out of the bend. Permanent cornering requires the driver to perform more steering corrections than in straight driving.

Based on the two afore-going statements, straight travel can be determined by monitoring the time development of the speed difference between the left-hand and right-hand wheels of the axle not driven (or deemed non-driven).

Figure 4:
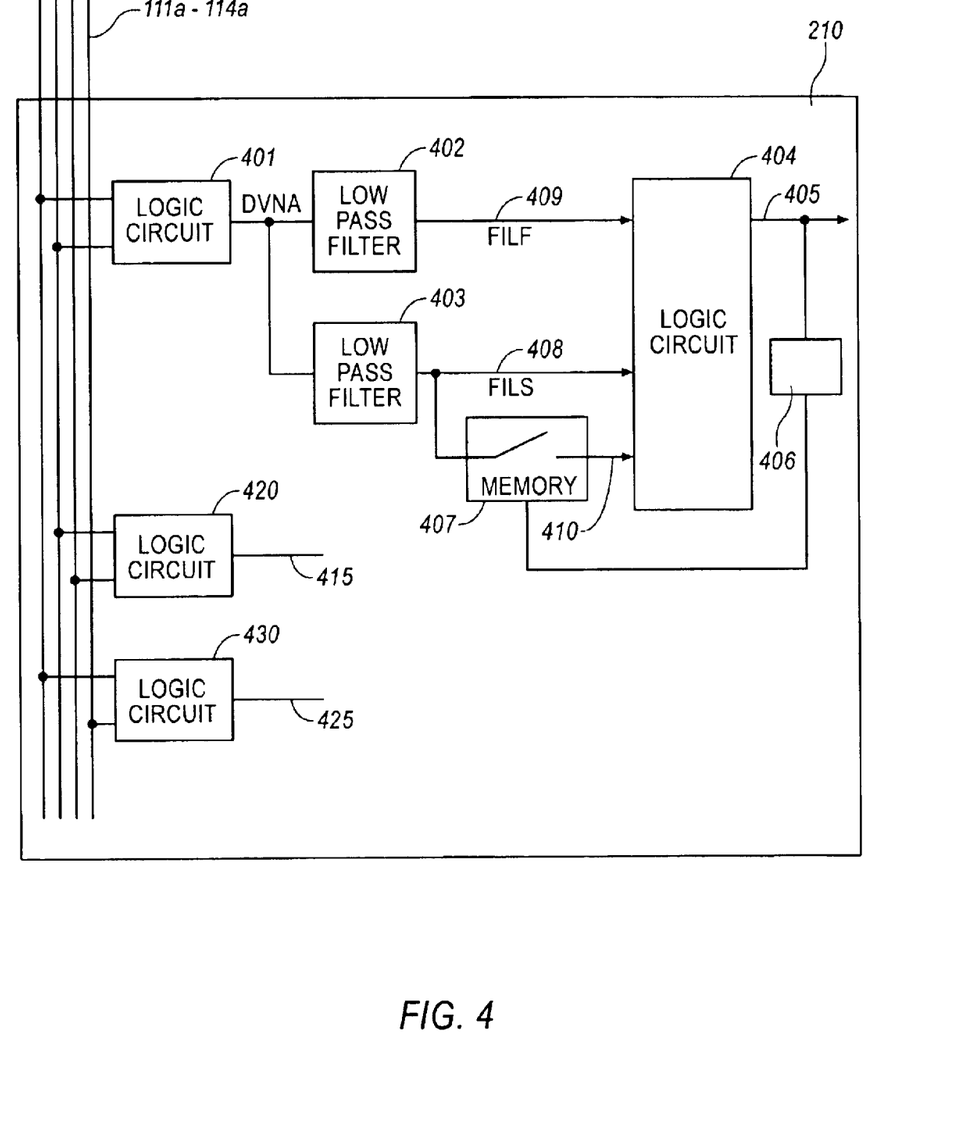
FIG. 4 shows a form of embodiment of a state-detection means.

FIG. 4 shows a logical circuit serving for straight ravel detection. It can be integrated, for example, in the state detection 210 according to FIG. 2. Unit 401 determines the percentage speed of the wheels of an axle, preferably of the axle non-driven for which purpose the speeds of the wheels of that axle are received, i.e. signals 111$a$ and 112$a$ from the front axle for a vehicle with tail drive. Unit 401 can form and issue the difference, preferably the normalized difference, more preferred normalized to the lower of the two differences. The value can be signed in response to the speed ratios (V4>V3 or V3>V4). Numerals 402 and 403 designate two filters of different time constants. They receive and filter the output signal CDVNA of unit 401. They are both low pass filters. 402 has a higher time constant than filter 402, for example, a time constant higher by at least the factor 5–10. The time constant of the deep pass fitter 402 can be in the range of between 10 and 100 Ms. FILS (filter slow) and FILF (filter fast) are formed as output signals. These signals arc evaluated in block 404. A signal 405 is generated that identifies straight travel and that can be used for generating a signal for actuating the gate circuit 221 according to FIG. 2. The slow-filtered value from filter 403 can be interpreted as "memory" for values going back to the past. If a difference results between the two filtered output values FILF and FILS, this will be indicative of dynamic steering and, hence, a non-straight travel.

Figure 5:
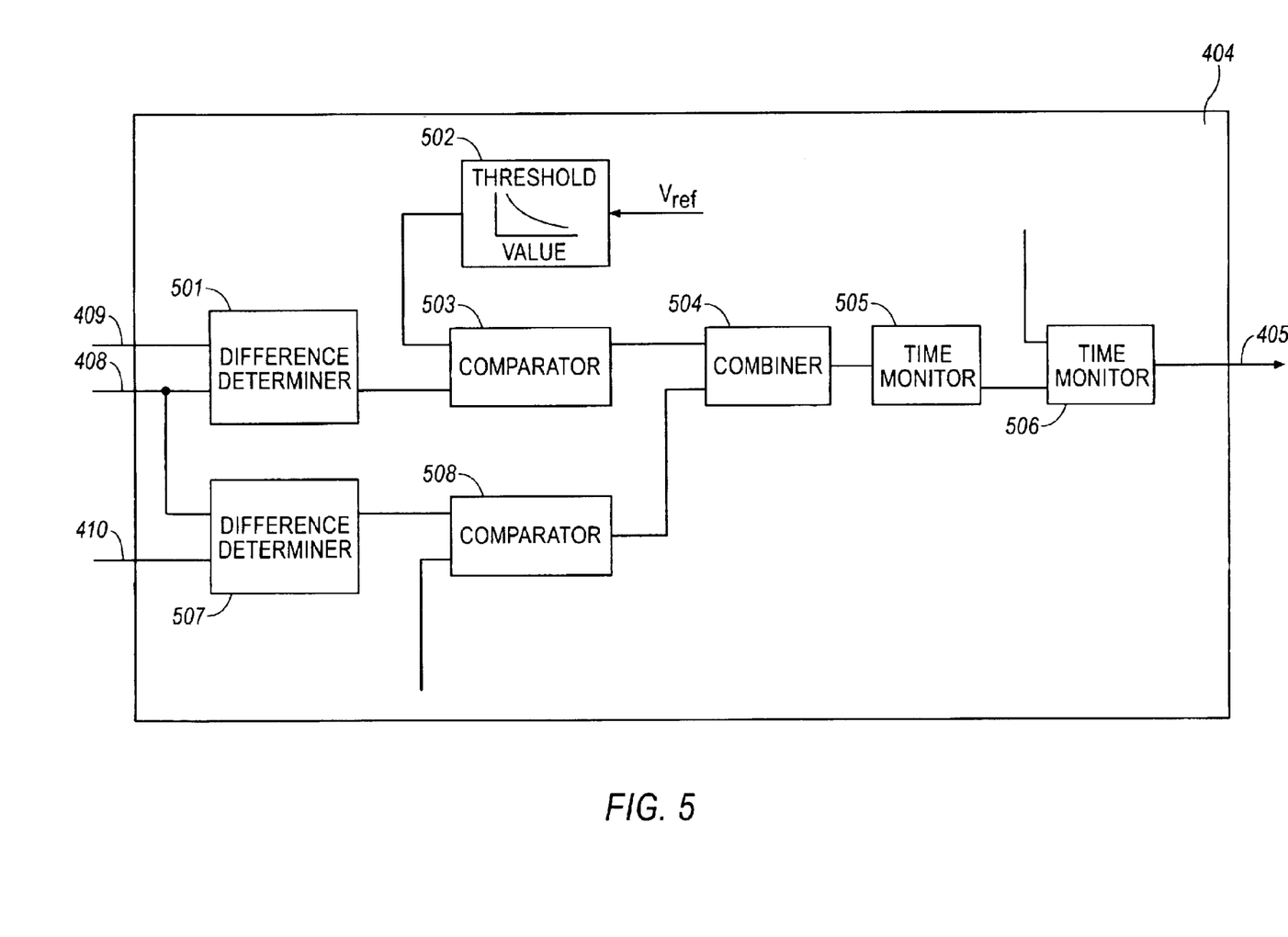
FIG. 5 shows a form of embodiment of a logical circuit for detecting straight driving.

The logical circuit 404 is shown in greater detail in FIG. 5. The amount of the difference between FILS and FILF is formed in block 501. The said difference is compared in block 503 to a threshold value from unit 502 that is dependent on driving speed Vref. The threshold can decrease with an increasing driving speed. Consequently, block 502 receives the vehicle speed as an input value. If the difference (output value of block 501) is lower than the threshold value (output value of block 502) this is indicative of straight travel (block 503 in saturated state). The speed-responsive decrease of the threshold will take place because, on the one hand, the driver' steering corrections decrease with increasing speeds and, on the other hand, the range of values of FILS increasingly narrows in view of the limits set by driving physics. In blocks 505 and 506 time monitoring takes place. It can be monitored whether the threshold is completely maintained over a predetermined period of time (e.g. between 1 and 8 seconds, preferably between 2 and 4 seconds) or over a predetermined percentage of time (more than 90%; more than 95% of the time interval). Stated differently, exceeding the threshold value by a predetermined amount is acceptable to increase the interference resistance. After compliance with this condition straight travel is detected and signal 405 generated. Dynamic steering movements are filtered out by this logical circuit.

The filter time constant of filter 403 is to be so selected that turning processes be displayed over an adequately long period of time, whereas the straight travel following cornering should be recognized adequately fast; FILS and FILF, hence, must converge rapidly. To detect slow or continuous turning processes, an additional logical circuit is provided for monitoring slow changes in FILS (drifting off). The value of FILS is tapped off at a predetermined time to be stored in block 407 of FIG. 4. Subsequently, the differences between the said stored value and FILS are formed in block 507 to be compared in block 508 with a threshold, thereby checking whether FILS is within a range of tolerance and the stored value (in block 407). This condition can be additionally used for detecting the straight travel; it can be AND-combined in block 504 with the afore-described signals. This embodiment shows that this latter-mentioned condition also applies to the time evaluation 505 and 506. The output signals 405 can be used either for releasing transverse scaling or for storing data suitable herefore (i.e. the then determined speed values of the wheels on the contemplated axle).

FIG. 4 schematically shows, in the form of blocks 420 and 430, logical circuits for detecting a state favorable to longitudinal scalining for one or the other side. For example, unit 420 may be a logical circuit for detecting a state favorable for longitudinal scaling on the right-hand vehicle side. The logical circuit then at least makes reference to the wheel signals 112$a$, 113$a$ (and to corrected values thereof, respectively). The logical circuit 420 also can make reference to additional signals (not shown), for example, detection of straight travel by suitable additional sensors. Once a favorable condition has been detected, the signal 415 indicative of that state, is generated which causes additional measures, for example, storing of wheel data or performing longitudinal scaling, to be taken. The same applies to logical circuit 430 accordingly. It can be designed for detecting a state favorable to longitudinal scaling of the left-hand side. It then makes reference to the wheel signals 111$a$ and 114$a$ and, optionally, to additional signals (not shown). It can generate a signal 425 to be understood in analogy to signal 415. Hence, the signals 405, 415 and 425 form a group of signals which can each cause individual scaling (longitudinal or transverse, respectively) and the storage of data herefore, respectively.

Figure 6:
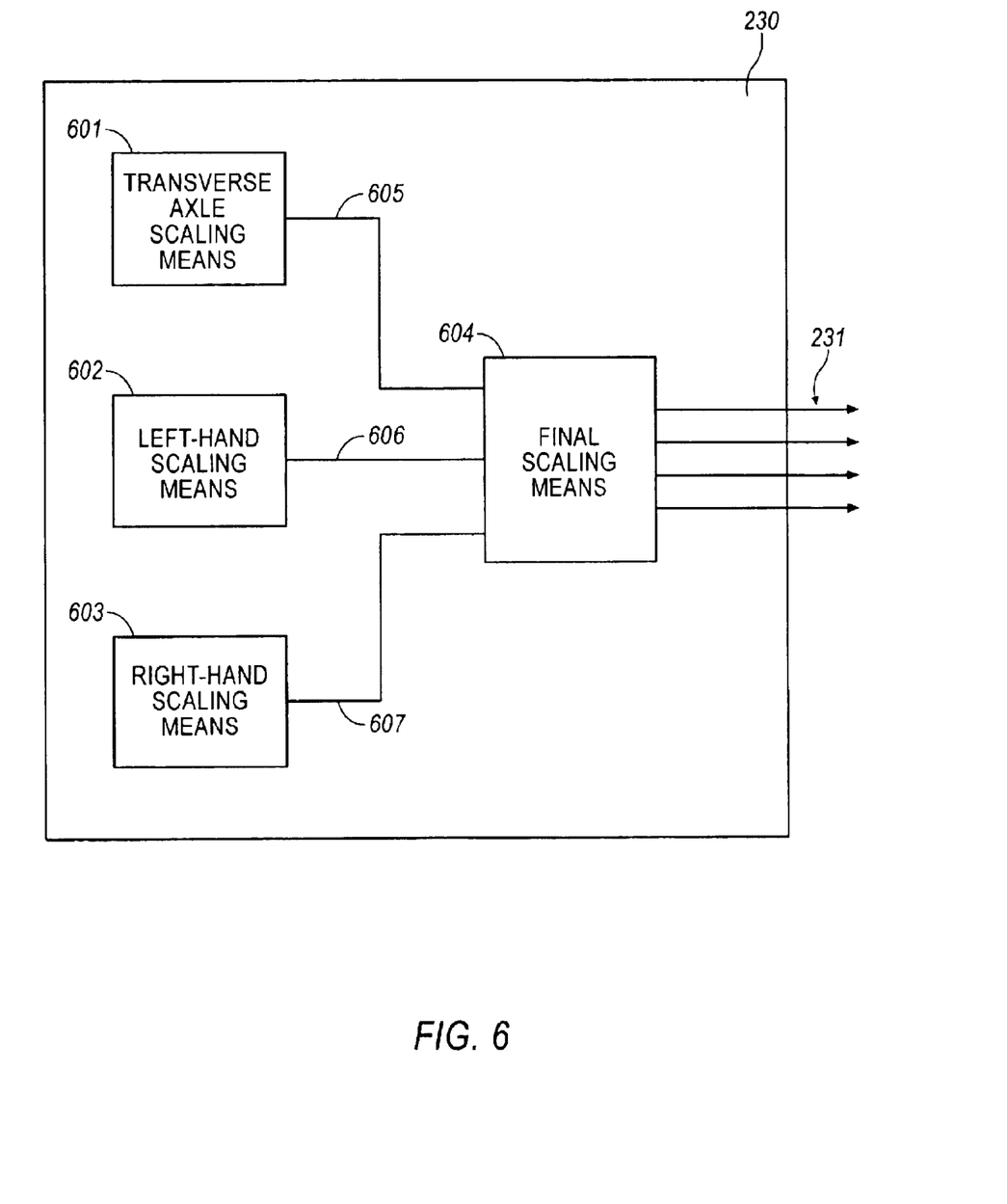
FIG. 6 shows a form of embodiment of a device for determining correction values.

FIG. 6 schematically shows device 230 for determining the correction factor as shown in FIG. 2, comprising means 601 to 603 for effecting three individual scalings (longitudinal and transverse) and the means 604 for effecting final scaling and for determining the values of correction. In the form of embodiment as shown, numeral 601 refers to the means for effecting transverse scaling on the axle non-driven or deemed non-driven; 602 and 603 refer to means for effecting longitudinal scaling on the left-hand and right-hand axles. Signals 605 through 607 issued by these components are received and processed in final scaling 604. Components 601 through 603 receive the respectively needed input signals. For the sake of ease they have not been shown in FIG. 6. Means 604 is also able to receive additional signals. Means 601 through 603 carrying out individual scaling cannot operate until the wheel data required for the respective scaling be available, unless they are in the process of being determined or have already previously been stored. Means 604 will start operation after the respective individual scalings having been carried out by means 601 through 603.

Figure 7:
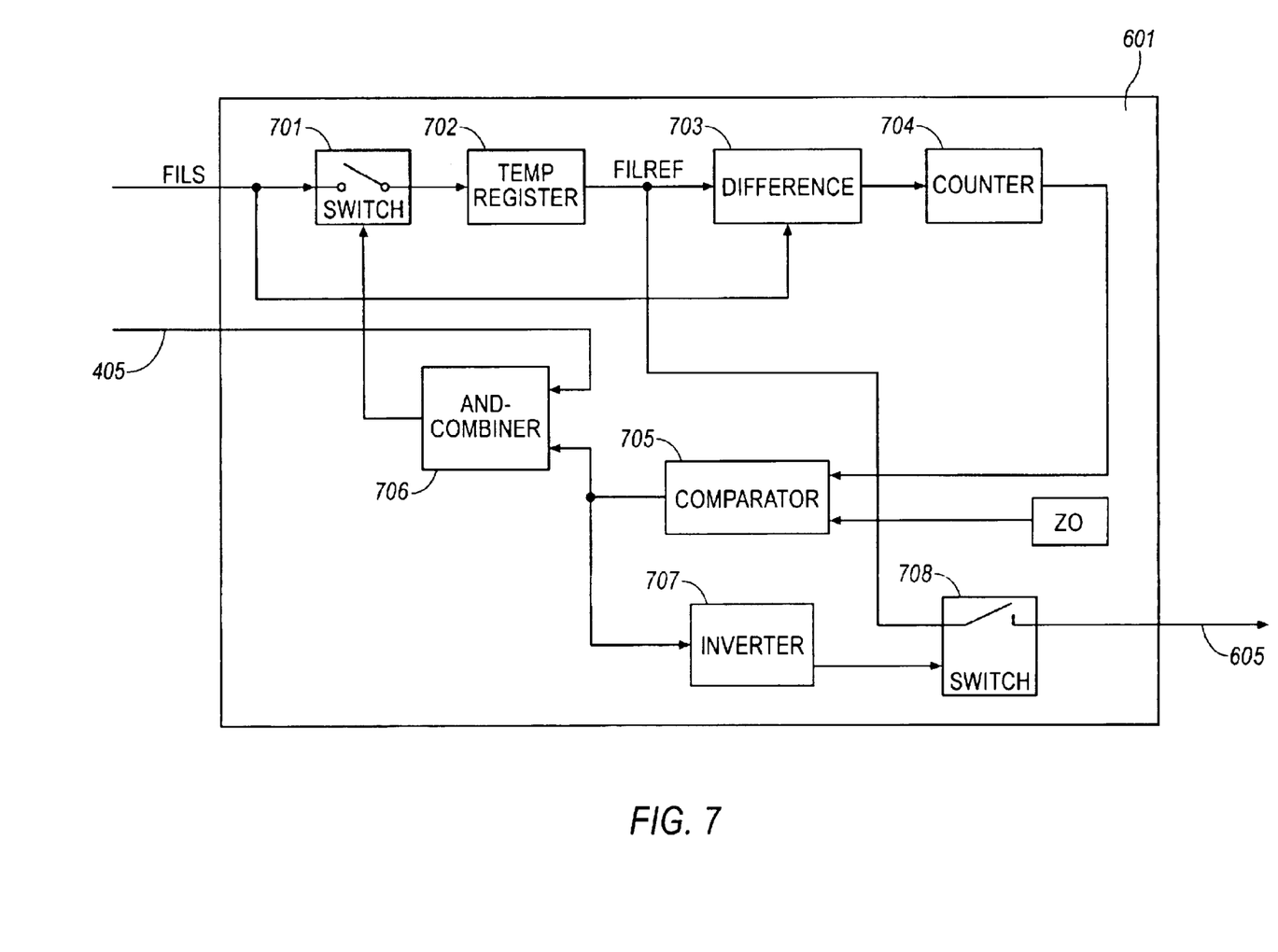
FIG. 7 shows an embodiment of a means for transverse scaling.

FIG. 7 schematically shows a form of embodiment of a logical circuit for effecting transverse scaling. It corresponds to component 601 shown in FIG. 6. The means receives (or generates itself) the FILS signal from the detection means. Moreover, it receives signal 405 indicative of a straight travel. Once a straight travel is detected, the value of FILS is stored in the temporary register to be issued as FILREF. These steps are taken upon first detection of a straight travel. Thereafter FILREF is tracked with half the difference of FILREF and FIIS (block 703). In each tracking FILREF is compared to the current FHLS value. If a defined accuracy is reached (which is detected via the difference of FILREF and FILS), a counter 704 is incremented. The result of count is indicative of the accuracy of the FILRlF value. If an adequate result of count (ZO) is reached, the value of FELREF is regarded to be accurate and is then fixed. Comparator 75 compares the result read on counter 704 to a threshold ZO.

Numeral 707 forms an inversion; numeral 708 is a switch indexing the value FILREF to output 605 once the result of count is adequate. In block 706, the straight travel signal 405 and the actuating signal from the comparator 705 are AND-combined to enable actuation of switch 701. Also after fixation of FILREF in recurrent accuracy acknowledgements, the counter is continued to be incremented to achieve an increasing error resistance. If straight travel detection criteria are fulfilled, but the accuracy threshold is markedly fallen below, the counter 704 is decremented. The way of counting may be affected by hysteresis, for example, in that decrementing is slower than incrementing (decrement=increment/3). If the counter falls below ZO, FWLREF can be changed again.

In order to be able to statistically evaluate different driving situations, incrementing and decrementing, respectively, of counter 704 can additionally be limited in time. The number of changes of counter 704 within a defined time interval can be limited, for example, to 2 per time interval of about 2 to 12 s. If the result of count exceeds the threshold of acknowledgement ZO, it can be switched to a larger time frame, such as about 10–20 s, in that the counter is allowed to be incremented or decremented to a limited extent, for example only one time.

As a result of transverse scaling, a confirmed value of FILREF will appear on the output 605, i. e. a value virtually resulting from FILS.

The formulae referred to in the afore-going can be implemented in components 602 and 603 of FIG. 6 to determine the values Kv1 to Kv4. For example, the component 602 can issue the variables Kv1 and Kv4; component 603 would then issue Kv2 and Kv3. Consequently, the values Kv1, Kv2, Kv3, Kv4 and FILREF are received by unit 604. The factors of correction K1, K2, K3 and K4 for the wheels 101 through 104 and the wheel speeds, respectively, can be determined therefrom as described hereinafter.

Basically, the two individually effected longitudinal scalings can be related to one another via the transverse scaling effected so that the condition according to which the speeds of all wheels are to be comparable in pairs with one another, can finally be complied with. Moreover, there may be additional requirements to be fulfilled: For example, it might desirable to scale the wheels to the slowest wheel. In that case, the method described hereinafter can be employed, which relates to the example of a tail-driven vehicle. If it is to be employed with a front-driven vehicle, the indices between front and rear axles would have to be exchanged (1 for 4 and 2 for 3).

If the difference of Kv1 and Kv2 is compared to the FILREF value, it is possible to determine on what side and by what amount the side-wise corrected wheel speeds are larger, namely by the amount Kv2–Kv1–FELREF. The final correction values K1 to K4 under consideration of this amount of correction in respect of the subsidiary variable will be:

DIF=Kv2−Kv1−FILREF. If DIF>0:
K1=Kv1
K4=Kv4
K2=Kv2−DIF
K3=Kv3−DIF

If DIF<0:
K1=Kv1−DIF
K4=Kv4−DIF
K2=Kv2
K3=Kv3.

The so obtained values of correction K1 to K4 can be used with the correction means 240 as correction factors for the multiplicative correction of the speed values determined by the wheel sensors. If the latter are designated by V1 to V4 and the respectively corrected values by Vk1 to Vk4, the following applies:

Vk1=V1×K1/C,
Vk2=V2×K2/C,
Vk3=V3×K3/C,
Vk4=V4×K4/C, wherein C is a normalized component.

In a first numerical example it is assumed that in transverse scaling on the right-hand vehicle side, a wheel speed lower by 3% was sensed compared to the left-hand vehicle side (due to larger tire diameters). The longitudinal scalings have revealed respectively identical speeds at On the front, right; and at the rear, right; and at the front, left; and at the rear, left. FILREF is thus 3%, assuming that Kv1 to Kv4 are respectively 1000.

FILREF is related to the same basis as the preliminary factors of correction Kv1 to Kv4. If the said basis is 1000,as mentioned in the afore-going, FILREF relates to 30. The resultant correction values K2=K3=1000 and K1=K4=970 arise from the formulae referred to.

In a second example for a tail-actuated vehicle, different wheel speeds are sensed on account of tire diameter differences. Related to the minimum wheel speed, V1 (front, left) is 5% higher, V4 (rear, left) 3%. Through longitudinal scaling, left, the following values result: Kv1=980; Kv4= 1000, Kv2=Kv3=1000; in transverse scaling, FILREF relates to 5% or (normalized to 1000) to 50. The resultant correction values are then K1=950; K2=K3=1000 and K4=970.

The afore-described methods and devices enable correction values, in particular, factors of correction, to be determined fast and reliably for the correction of sensed wheel speeds, thereby increasing the reliability of the control measures taken in reference to the corrected wheel speeds. Equally, it is possible to evaluate the speed differences in cornering due to geometrical condition by the corrected wheel speeds of the axle non-driven or deemed non-driven, and to carry out transverse acceleration computation.

What is claimed is:

1. A method for determining correction values for wheel speeds of a vehicle, comprising the step of:
   determining the speeds of the vehicle wheels during travel,
   evaluating the speeds of the wheels in groups, for the wheels of the non-driven axle, and for the wheels of the left-hand vehicle side and the right-hand vehicle side to obtain initial correction values for the non-driven axle, for the left-hand vehicle side, and for the right-hand vehicle side based on the speeds of the wheels in the groups,
   and determining final correction values for the individual wheels of the vehicle in accordance with the initial non-driven axle, left-hand vehicle side, and right-hand vehicle side correction values obtained in the evaluation step
   wherein a preliminary correction value is selected for the slowest wheels on each side of the vehicle, and for the remaining wheel on each side, a preliminary correction value is determined in accordance with the slowest wheel speeds determined on that respective side.

2. A method according to claim 1, wherein the evaluation in groups is effected for wheel speeds in relation to the wheel speed values determined during a state of travel in which conditions exist that are favorable for the evaluation of the wheel speed values of the group under consideration.

3. A method according to claim 2, wherein the determined speeds of the vehicle are determined during a straight travel of the vehicle.

4. A method of claim 3, wherein the wheel speeds used for the evaluation grouped by vehicle sides are determined at different times than the wheel speeds used for the evaluation grouped by vehicle axles.

5. A method according to claim 3, wherein the straight travel of the vehicle is detected by evaluating the time sequence of the difference of the wheel speeds preferably on the non-actuated axle of the vehicle.

6. A method according to claim 5, wherein the difference of the wheel speeds includes using a first low pass filter with a first time constant and, in parallel thereto, and using a second low pass filter with a second time constant exceeding the first time constant, and further including checking whether the amount of difference of the output signals of the two filters is below a threshold value.

7. A method according to claim 6, wherein the first time constant is in the range of between 10 and 100 s.

8. A method according to claim 6, wherein the second time constant has a value 5 to 15 times the value of the first time constant.

9. A method according to claim 6, wherein the threshold value decreases with an increasing vehicle speed.

10. A method according to claim 6, further including the step of checking whether the amount of difference of the output signals of both filters, within a gating time, permanently or at least for an adequate period of time, falls below the threshold value, and that, once this criterion is fulfilled, straight driving is detected.

11. A method according to claim 10, further including the step of detecting straight driving, checking the time sequence of the output signal of the second deep pass and determining whether, within a gating time, it permanently or for an adequate period of time, falls below a threshold value.

12. A method according to claim 6, wherein the evaluation in groups for the wheels of one axle is continuous in that upon detection of straight driving, the output signal of the second low pass filter is stored as a reference value preliminarily representing the result of the evaluation, the reference value is compared to current output signals of the second low pass filter and, in case of differences, the reference value is tracked with part of the difference to the current signal value, with an acknowledgement signal used to release the stored reference value being additionally generated if the difference within a predetermined period of time was sufficiently small.

13. A method according to claim 2, wherein the speeds of the vehicle wheels are determined during a disengaged state.

14. A method according to claim 2, wherein the speeds of the vehicle wheels are determined during a travel state in which the driving moment or the vehicle acceleration is positive and the speed of the wheel on the axle driven is lower than the speed of the wheel on the axle non-driven or during a travel state in which the driving moment or the vehicle acceleration is negative and the speed of the wheel on the axle driven is higher than the speed of the wheel on the axle non-driven.

15. A method according to claim 1, wherein the evaluation in groups of wheel speeds covers ratio formation or difference formation or pair-wise normalization of the speeds of the wheels of this group.

16. A method according to claim 1, wherein a correction value is selected for one wheel, wherein in accordance with the results of evaluation, correction values are determined for the rest of the vehicle wheels.

17. A method according to claim 1, wherein the correction values are determined from the preliminary values of correction in accordance with the wheel speeds determined on one axle.

18. A method according to claim 1, wherein the determination of the wheel speed of the vehicle wheel includes sensing the rotating speed of the wheel by means of a wheel sensor and, subsequent filtering of the sensed values.

19. A device for determining values of correction for the wheel speeds of a vehicle, comprising:
   wheel sensors for determining the speeds of wheels of the vehicle during travel,
   determining means for evaluating the speeds of the vehicle wheels in groups for at least one vehicle axle, for a left-hand vehicle side and for a right-hand vehicle side to obtain initial correction values, and
   means for determining the final values of correction for the individual wheels of the vehicle in accordance with the initial vehicle axle, left-hand vehicle side and right-hand vehicle side correction values obtained by the determining means for evaluating the speeds of the vehicle wheels
   further including state detection means for determining a driving state in which conditions for the wheel speed values of the group under consideration prevail that are favorable for evaluating wheel speeds, in groups
   wherein the state detection means further includes detecting means for detecting straight travel of the vehicle
   wherein the detecting means for detecting the straight travel of the vehicle further includes at least one low pass filter for evaluating the value of the difference between the wheel speeds of one axle
   wherein the detecting means for detecting the straight travel further includes a first low pass filter having a first time constant, and a second low pass filter having a second time constant exceeding the first time constant, and a check means for checking the difference of the output signals of the two filters.

20. A device according to claim 19, wherein the determining means further includes a means for evaluating, in groups, the speeds of the wheel of the non-driven axle, and respectively one device for evaluating, in groups, the speeds of the wheels on the left-hand vehicle side and the right-hand vehicle side.

21. A device according to claim 20, wherein said device for evaluating, in groups, wheel speeds includes a means for forming the ratio or the difference or for the normalization, in pairs, of the speeds of the wheels of the said group.

22. A device according to claim 19, wherein state detecting means further includes detecting means for detecting the disengaged state in the vehicle.

23. A device according to claim 19, wherein the first time constant is in the range of between 10 and 100 ms.

24. A device according to claim 19, wherein the second time constant has a value 5 to 15 times the first time constant.

25. A device according to claim 19, further including means for checking whether the amount of difference of the output signals of both filters, within a gating time, permanently or at least for an adequate period of time, falls below the threshold value.

26. A device according to claim 19, further including means for checking the time sequence of the output signal of the second deep pass filter.

27. A method for determining correction values for wheel speeds of a vehicle, comprising the step of:

determining the speeds of the vehicle wheels during travel, evaluating the speeds of the wheels in groups, for the wheels of the non-driven axle, and for the wheels of the left-hand vehicle side and the right-hand vehicle side to obtain initial correction values for the non driven axle, for the left-hand vehicle side, and for the right-hand vehicle side based on the speeds of the wheels in the groups, and determining final correction values for the individual wheels of the vehicle in accordance with the initial non-driven axle, left-hand vehicle side, and right-hand vehicle side correction values obtained in the evaluation step wherein the evaluation in groups is effected for wheel speeds in relation to the wheel speed values determined during a state of travel in which conditions exist that are favorable for the evaluation of the wheel speed values of the group under consideration wherein the determined speeds of the vehicle are determined during a straight travel of the vehicle wherein the straight travel of the vehicle is detected by evaluating the time sequence of the difference of the wheel speeds preferably on the non-actuated axle of the vehicle wherein the difference of the wheel speeds includes using a first filter with a first time constant and, in parallel thereto, and using a second filter with a second time constant exceeding the first time constant, and further including checking whether the amount of difference of the output signals of the two filters is below a threshold value.

* * * * *